United States Patent [19]

Menke

[11] 4,204,122
[45] May 20, 1980

[54] METHOD OF AND DEVICE FOR SCANNING PICTURES

[75] Inventor: Josef F. Menke, Glücksburg, Fed. Rep. of Germany

[73] Assignee: Electro Optik GmbH & Co. KG, Glücksburg, Fed. Rep. of Germany

[21] Appl. No.: 933,597

[22] Filed: Aug. 14, 1978

[51] Int. Cl.² ............................ G01J 1/00; H01J 31/49
[52] U.S. Cl. .................................... 250/347; 250/334
[58] Field of Search ............... 250/332, 334, 347, 349; 350/6.2, 6.4; 358/113

[56] References Cited
U.S. PATENT DOCUMENTS

| 4,023,201 | 5/1977 | Faulkner | 250/342 |
| 4,090,774 | 5/1978 | Zeifang | 350/6.4 |

FOREIGN PATENT DOCUMENTS 2522049 12/1976 Fed. Rep. of Germany.

Primary Examiner—Alfred E. Smith
Assistant Examiner—Janice A. Howell
Attorney, Agent, or Firm—Gilbert L. Wells

[57] ABSTRACT

A method and apparatus for generating a raster image, in particular when using thermal or infra-red radiation, using a suitable optical means to guide image strips of the object over a set of detectors consisting of several detectors mounted normally to the direction of motion of the image strips. The method is improved by passing the strips of the object image twice over the set of detectors (7) in one cycle of the optical means (3), the first and second image being relative offset in height.

8 Claims, 9 Drawing Figures

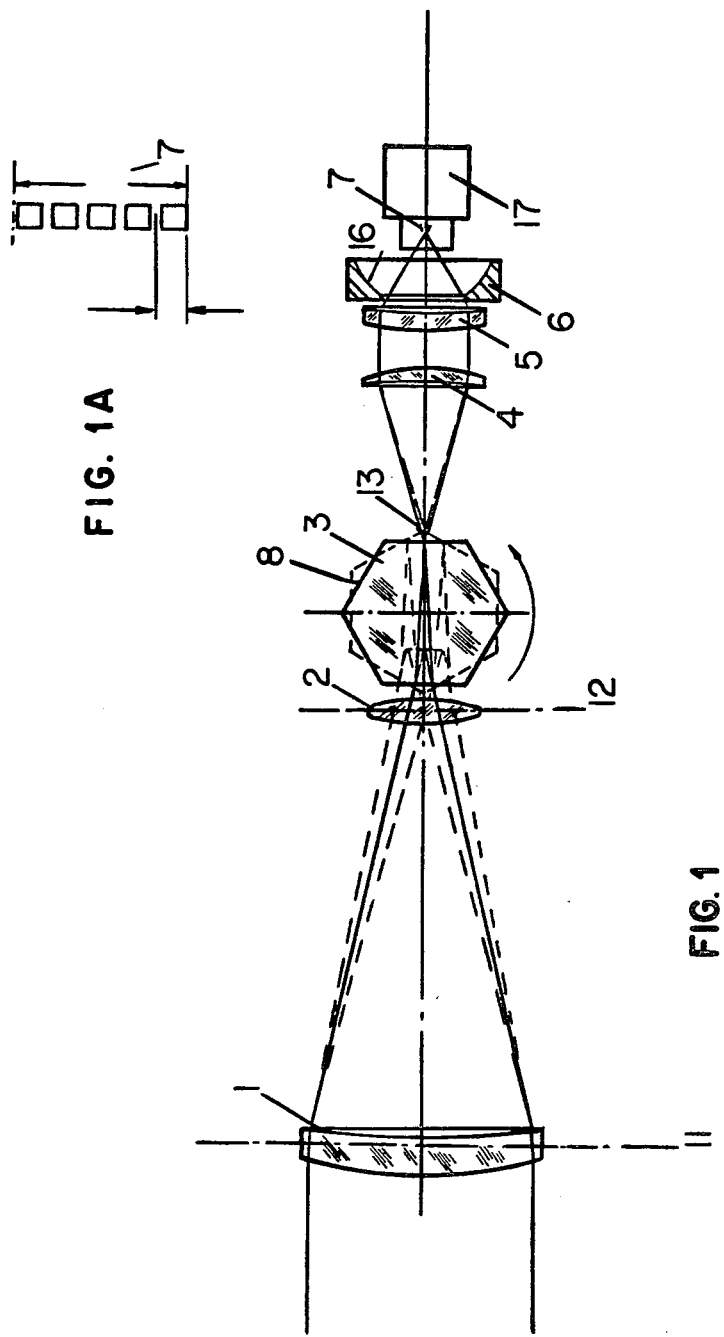

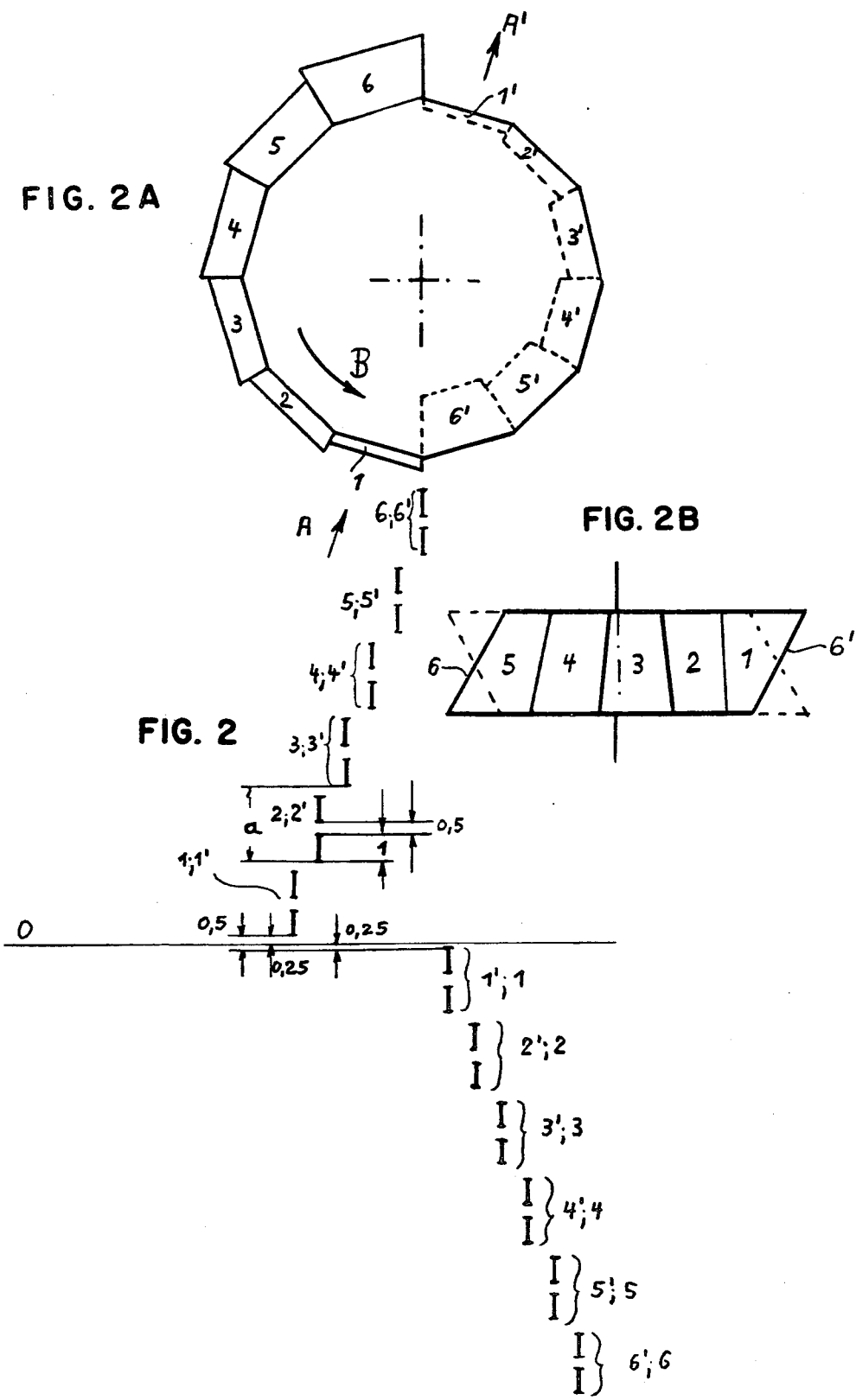

METHOD OF AND DEVICE FOR SCANNING PICTURES

BACKGROUND OF THE INVENTION

The present invention relates to a method for generating an image from an object which is scanned stripwise, these strips being combined into an image.

Such methods are known especially for generating thermographic images and also for generating infra-red (IR) images. Using a suitable optical means, for instance a polygonal prism with pairwise dihedral surfaces, images of object strips are projected on a striplike set of detectors consisting of several individual detectors arranged normally to the direction of motion of the strips of the object image.

To the extent a method or apparatus for generating images of objects by means of non-visible beams is concerned, the detectors control in known manner correspondingly arrayed light-emitting-diodes (LEDs) of which the visible beams then are preferably combined by the same optical means into a visible image. However, the detector can also be used to generate a video image.

Such a method, especially a polygon suited to generate image lines, is known for instance from German Published Application No. 25 22 049.

The design and operation of such a "dihedral polygon" has already been comprehensively described especially in the German Published Application No. 25 22 049, already mentioned. It is an essential characteristic of such a polygon that for one revolution of this polygon, the image will be written only once. It does not matter in this respect in what sequence the strips of the groups of lines of the image are being written, that is, whether in a constant manner as in FIG. 7, or alternatingly, as in FIGS. 8 and 9 of German Published Application No. 25 22 049, which are shown schematically, and explained in relation thereto.

The fact that the image is written only once per polygon revolution, however, results in a definite image line always being projected on the same detector. This presents the significant drawback that if this detector should fail, the information of this line will be lost, nor will it be retrieved after several further revolutions of the polygon, since it is always the same line which falls on the inoperative detector. In such a case there obtains a so-called "line wild-shot". If such an imaging instrument is used for instance as a target lock-on, point targets may well fall into the "dead" or dark line, get lost and be detected again only after the entire instrument has been moved.

SUMMARY OF THE INVENTION

Having in mind the limitations of the prior art, it is an object of the present invention to create both a method and an apparatus to implement this method, in which no information gap arises in the case of failure of one of the sensing detectors.

This object is achieved by the present invention in that the strips of the object image are guided twice over the set of detectors during one cycle of the optical means, the first and second images being relatively offset in height to one another.

Accordingly the concept of the present invention is that the image shall be written not only once, but twice, and to obtain the offset in height by having a given image line at the second image written by another detector. If a detector should fail, this line at least will be written by the other director, and the information of this line shall not be entirely lost, rather it shall be retained at least with half the intensity.

The number of individual detectors in a set of detectors may vary widely depending on the particular requirements. In order to implement the method also called "interlace", it is however recommended in general to offset the two images by ¼ of the size of the set upward and downward with respect to one another, whereby the images are relatively offset by ½ the size of the set.

The size of the set must be understood as the width of the set plus the spacing between two individual detectors. Similarly the significant raster size must be understood being the width of the individual detector plus the spacing between two of such individual detectors. In the first case this is equivalent to the spacing from center to center of the set (center of image strip), and in the second case with the spacing from the center of one individual detector to that of the next.

The method described so far ensures averting a total loss of information in the case of failure of one detector as one image line is concerned, as another detector would write the failed image line in the second image. In this kind of displacement, the lines always fall entirely on other detectors. However, the space between detectors still remains uncovered.

In order to sense this intermediary space also, it is further proposed not only to offset up and down the two images by ¼ of the size of the set, but also additionally by ¼ of the size of the raster. Overlaps are obtained in this manner in which a line will not precisely fall on another detector, rather the next line will overlap the inherent intermediary space between two adjacent single detectors.

As already mentioned, this method can be designated as "interlace" and can be implemented in all previously known systems for generating such raster images. If for instance a dihedral polygon is used to scan the object, the offset of the images can be obtained by a corresponding additional dihedral angle at the individual pairs of surfaces.

In such instruments, furthermore, corrective lenses may be employed for shifting the image plane of the image formed by the entry object to coincide with the circle of rotation of the edges between two adjacent polygon surfaces. Ordinarily the image would be formed within the polygon proper. By employing the corrective lens it is, however, possible to shift the image plane to the rear, i.e. behind the polygon in the direction of light travel.

Furthermore, transformation optics may be employed for transforming an image of the detectors to the said image plane. Thus the object image is generated directly on the detector elements.

In order to protect the detector against stray light a stop means may be provided in front of the detectors. It is suggested that this stop means may be formed as an autocollimative mirror which images the detector on itself. This is important because the detector, or detector array, is comprised in a cooling device, usually containing fluid (liquid) nitrogen. If the mirror would not image the detector on itself but would image parts of the mechanical holding means onto the detector, this would generate strong error signals in the detector.

BRIEF DESCRIPTION OF THE DRAWINGS

The drawing shows an embodiment of the present invention wherein a dihedral polygon is used for the strip-wise scanning of the object.

FIG. 1 is a schematic plan view showing the image-taking part of an apparatus for generating a raster image;

FIG. 1a is a view of a set of detectors;

FIG. 2 is a schematic showing of a line-scanning sequence by the polygon for which only one image is written for each polygon revolution;

FIG. 2a schematically shows a top view of a 12-sided polygon suitable for the line-scanning of FIG. 2;

FIG. 2b is a schematic elevation of the polygon of FIG. 2a;

FIG. 3b is a top view of a 12-side polygon suitable to implement the line-scanning of FIG. 3a;

DESCRIPTION OF THE PREFERRED EMBODIMENTS

Figure 3B:
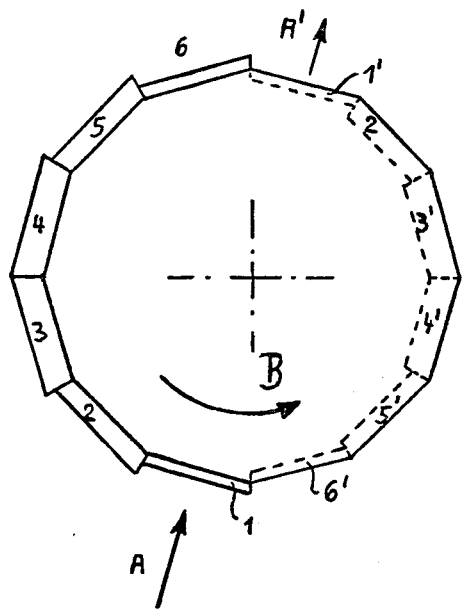

FIG. 1 shows entry objective 1, upon which are incident the rays from the object. These then pass through an auxiliary optics 2 and through a polygonal prism 3. The image plane of these optical elements is located at 13.

A set of detectors 7 is located behind the polygon, consisting of several detectors arrayed one above the other normal to the plane of the drawings. FIG. 1a shows a front view of the detectors. The number of detectors—five in this instance—depends on the particular embodiment and as a rule is much higher in number. They are mounted in a cooling device 17.

Transformation optics 4, 5 are mounted between the set of detectors 7 and polygon 3, projecting an image of the set of detectors 7 onto the image plane 13. Furthermore a stop 6 is provided, which is in the shape of a concave mirror 16 on that side facing the set of detectors. To protect against stray light, the radius of curvature of the concave mirror is so selected that the set of detectors is imaged on itself, that is, the concave mirror acts as an autocollimating mirror.

Polygon 3 is provided with lateral faces 8 which pairwise form a dihedral angle with the axis of rotation of the polygon, that is, they are at a slant to the plane of the axis of rotation. When polygon 3 is rotated, images of individual strips of the object are made to pass in known manner over the set of detectors, the object being resolved during one revolution in as many image strips as there are lateral faces. For the present illustrative embodiment of FIG. 1, this would be six image strips as the polygon is hexagonal. Each of these image strips is made to pass over the five detectors of set 7, so that the entire image is resolved into 6×5=30 image lines. The difference between the dihedral angles of the individual polygonal faces, which are pairwise plane-parallel when opposite one another, is such that one image strip is always offset higher by one size of a set (height of set + ½ the spacing between the detectors) compared to the next one.

A closer discussion is provided in relation to the illustrative embodiment of FIGS. 2, 2a showing a 12-side polygon (FIG. 2) cooperating with a set of detectors consisting merely of two detectors. This small number of detectors was selected to show the operation as clearly as possible.

For the purpose of demonstration, it is further assumed that the height of a single detector is 1 unit of the square graph paper, and that the spacing between the two detectors is ½ a unit. Therefore the size of the set of detectors is $1 + 1 + 2 \times \frac{1}{2} = 3$ units, while the raster size is $1 + \frac{1}{2} = 1.5$ units.

If it is assumed that a beam in the direction of arrow A–A' of FIG. 2a first is incident through the pair of faces 1;1' of the polygon, then upon rotating same in the direction of arrow B the lines 1;1' are written in FIG. 2. If now the more offset pair of faces 2;2' enters the region of beam A–A', then lines 2;2' will be correspondingly written more highly offset, until at last the uppermost line 6;6' of FIG. 2 will be written by the most offset pair of faces 6;6'.

Thereupon the same pairs of faces, but also at an opposite dihedral angle, enter the region of the beam A–A', lines 1;1' of FIG. 2 being written first up to lines 6;6'.

Accordingly in one revolution of the polygon, the object was resolved and scanned into 12 image strips each of 2 image lines. The process is repeated for every further revolution in precisely the same manner. The line O shown in FIG. 2 may be drawn through the image so obtained, passing between the two center sets of detectors and spaced as shown from the neighboring detectors.

The essential characteristic of this embodiment, however, is that the image is written only once per polygon revolution.

Furthermore, the sequence of strip scanning is wholly arbitrary. It need not be constant at all as was shown. Other possibilities are comprehensively listed in German Published Application No. 25 22 049.

If now, as explained initially when discussing the object, a detector should fail in the set of detectors, then this line shall be missing in every image strip and it will be dark and in any event the information will be lacking.

This drawback can be eliminated by the present invention in that the image of the object will be written not only once per polygon revolution, but rather that two mutually height-offset images shall be written.

Figure 3A:
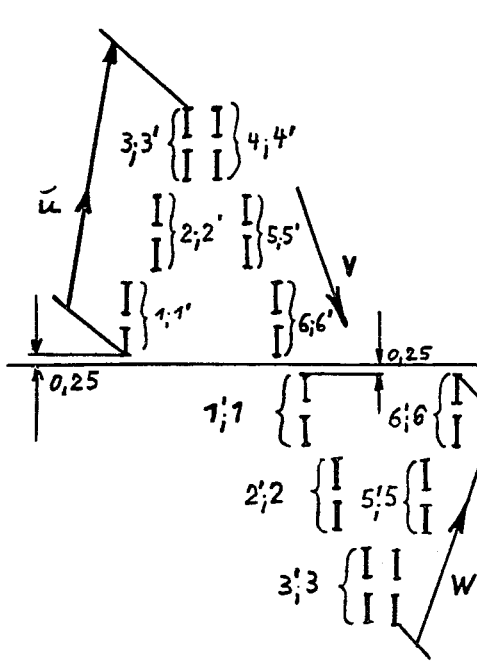
FIG. 3a is a schematic showing of a line-scan when two object images of the same height are written for one revolution of the polygon.

For greater ease of comprehension, FIG. 3a first shows those image strips that may be obtained by (constantly) scanning the object, FIG. 3b showing the associated polygon. It is easily seen that first the image strips 1;1' - 2;2' - 3;3' will be written. Next the image strips 4;4' through 6;6' and then 1';1 through 3';3; and then still the strips 4';4 - 5';5 - 6';6. This means that the image actually is written twice, the first time the upper half of the first image along the arrow "u", then the entire second image along arrow "v", and lastly the lower half of the image along arrow "w".

In this case the upper and lower strips are furthermore written twice one after the other.

It is clear nevertheless that this double writing of the image in itself is no help against the loss of information in the case of a detector failure. If for instance the upper detector should fail, the lines written by it will remain dark in all the image strips, and these lines always do coincide in both images.

This drawback can be eliminated only when the two images are written in height-offset manner according to the present invention. Namely one of the images must be offset downward by ¼ the set size and the other must be offset upward by ¼ the set size. Thereby the two images are height-offset by ½ of a set size with respect to each other, and the individual detectors rather than writing the same lines in the two images, write different lines, so that even if a detector should fail, the pertinent line shall appear at least in one line, that is, it shall not be lost.

Figure 3C:
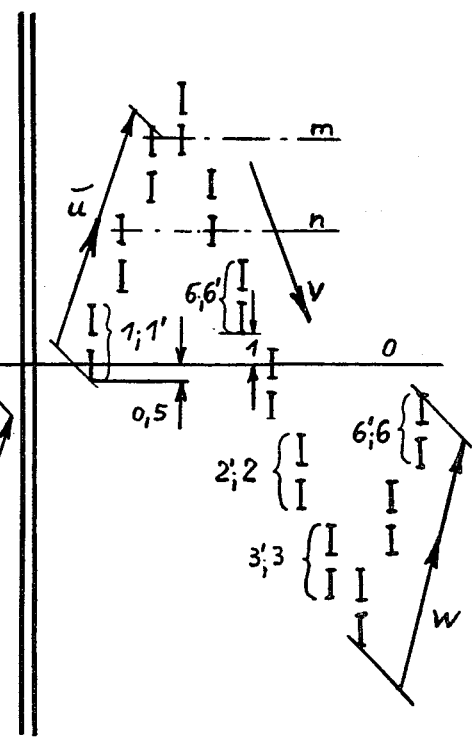
FIG. 3c is the schematic of a line-scan for which two object images offset in height with respect to each other are written for one revolution of the polygon.

This is shown in FIG. 3c, which must be compared with FIG. 3a. The downward offset of one of the images is most clearly shown from the image row 1;1'. In FIG. 3a the lower image line is spaced by ½ the intermediary space above the O line. The size of the set, as indicated above, amounts to 3 units. Therefore ¼ of the set size is 0.75 units. Accordingly the lower edge of this image line is ¼ unit below the O line in FIG. 3b. All other lines follow at the previously determined spacing, whereby the upper edge of the upper image line of the last image row (6;6') is offset downward by ¼ set size. This edge in FIG. 3a was ¼ unit below the O line and in FIG. 3c is now 0.25+0.75=1 unit below the O line. This clearly shows that the entire first image written in the "u" and "w" direction is offset downward by ¼ set size.

Similarly, however, the second image written in the "v" direction also has been offset by ¼ set size, though in the opposite, i.e., upward direction. This is most clearly seen from the image row 6;6', of which the lower edge in FIG. 3a is a distance of ¼ above the O line but a distance of 0.25+0.75=1 unit above it in FIG. 3c. The remaining image rows or lines of this image all being at the fixed spacing from this image row, it follows that the entire image has been offset upward by ¼ set size.

It follows from this offset of the two images by a total of ½ set size relative to each other that the same detector will not write the same line in both images.

This is clearly seen in FIG. 3c with respect to the image lines 'm' and 'n'. For instance, the line 'm' is written in one image by the upper detector and in the other image by the lower detector. This applies similarly to line 'n' and all others.

Even when a detector fails, the line shall not be lost, rather it will be written in one of the two images.

It must be noted, however, that this image offset would not come about by for instance displacing or offsetting detectors 7. These are instead fixed in position. The offset only comes about by increasing the "normal" dihedral angles of the polygon faces, where this addition depends on the set size. Such addition is different for a set of 10 detectors than for one of 20, but in all cases is so small that it cannot be shown in the drawing. Therefore no attempt was made to show a polygon suitable for FIG. 3c.

Still the embodiment of FIG. 3c suffers from a drawback, namely that the lines of the image strips, even when mutually height-offset, coincide perfectly. Accordingly there remains the detector spacing between the individual image lines (½ unit in the above example), which provides no information.

In order to obtain further information also from these spaces, the invention proposes furthermore that the images, instead of being each offset upward or downwrd by ¼ set size, be instead offset by ¼set size +¼ raster size.

Figure 4:
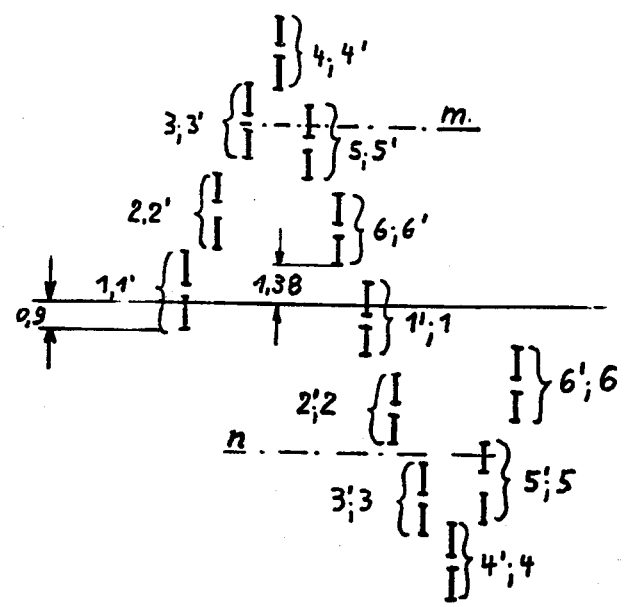
FIG. 4 is a schematic of a line-scan such that for one revolution of the polygon, two mutually height-offset object images are written with coverage of the spaces between the detectors.

This is shown in FIG. 4. For clarity, be it noted again that for the initial FIG. 3a, the lower edge of the image line 1;1' is ½ a spacing =¼ units above the O line. In FIG. 4 this edge is offset downward by ¼ set size (=0.75) plus ¼ raster size (=1.5/4=0.38) and now is at a spacing of 0.88≈0.9 below the O line. The second image is similarly offset upward. Therefore the individual lines in the images or image strips no longer coincide perfectly, rather they are additionally so relatively offset that each time one line of one image overlaps the adjacent spacing in the other image. This can be seen once more from auxiliary lines 'm' and 'n'.

In conclusion, only the image-taking part of an instrument for generating a raster image is shown in FIG. 1. The manner in which the output signals of the detectors are processed—for instance into a video image, or when constructing an image of IR or thermal rays into a visible one—is known and therefore not discussed further.

I claim:

1. In a method for generating a raster image of an object, in particular when using thermal or infra-red radiation, using a rotating polygon raster having a given size to guide images of individual strips of the object over a set of detectors consisting of a plurality of detectors having a given size defined by the width of the set plus the spacing between two individual detectors mounted normally to the direction of motion of the image strips, the improvement comprising:

resolving at least two images of said object during one revolution by simultaneously passing at least a pair of strips of the object image over the set of detectors (7) in one cycle of the polygon raster and generating at least first and second images of said object relatively offset in height.

2. The method of claim 1, wherein the two images are each offset upward and downward respectively by ¼ the size of the detector set.

3. The method of claim 2, wherein the two images additionally are offset upward and downward respectively by ¼ the raster size.

4. In an apparatus for generating a raster image of an object, in particular when using thermal or infra-red radiation, said apparatus having suitable optical means to guide images of individual strips of the object over a set of detectors consisting of a set of detectors having a given size defined by the width of the set plus the spacing between two individual detectors mounted normally to the direction of motion of the image strips, where said optical means is a rotating dihedral polygonal prism raster having a given size (3), the improvement comprising:

resolving at least two images of said object during one revolution of said prism by providing individual pairs of faces (1;1'-6;6') of said polygonal prism (3) which are additionally dihedral by that angle which shall effect the displacement of the image strip by ¼ the size of the detector set upward and downward.

5. The apparatus of claim 4, wherein said individual pairs of faces (1;1'-6;6') of said polygonal prism (3) are additionally made more dihedral by that angle which effects the offset of the image strips by ¼ the size of the detector set plus ¼ the raster size upward and downward.

6. The apparatus of claim 5, wherein said dihedral polygonal prism (3) is combined with a lens (2) in front of it and of which the focal length is substantially equal to the distance between its main focal plane (12) and the main focal plane (11) of the entry objective (1).

7. The apparatus of claim 5, wherein said dihedral polygonal prism (3) is combined with a transformation optics (4;5) having dimensions that transform the detector set (7) onto the edges of said polygonal prism (3).

8. The apparatus of claim 5, wherein said dihedral polygonal prism (3) is combined with mirrorized optical elements and holders imaging the detectors on themselves and thereby defining autocollimating mirrors (16).

* * * * *